United States Patent
Tuma

(10) Patent No.: US 7,807,081 B2
(45) Date of Patent: Oct. 5, 2010

(54) METHOD FOR PRODUCING A SUPPORTING WEB, AND SUPPORTING WEB

(75) Inventor: Jan Tuma, Herrenberg (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 53 days.

(21) Appl. No.: 11/630,978

(22) PCT Filed: Sep. 8, 2005

(86) PCT No.: PCT/EP2005/009646

§ 371 (c)(1),
(2), (4) Date: Dec. 28, 2006

(87) PCT Pub. No.: WO2006/058569

PCT Pub. Date: Jun. 8, 2006

(65) Prior Publication Data

US 2008/0050553 A1    Feb. 28, 2008

(30) Foreign Application Priority Data

Dec. 3, 2004    (DE) .................. 10 2004 058 257

(51) Int. Cl.
*B29C 41/02*    (2006.01)

(52) U.S. Cl. ........................ 264/166; 264/175
(58) Field of Classification Search ............. 264/175, 264/511, 556, 571; 156/242

See application file for complete search history.

(56) References Cited

U.S. PATENT DOCUMENTS

| 5,212,855 | A | 5/1993 | McGanty |
| 5,512,234 | A * | 4/1996 | Takizawa et al. ............ 264/511 |
| 6,280,670 | B1 | 8/2001 | Buzzell et al. |
| 2003/0167667 | A1* | 9/2003 | Gerber et al. .................. 40/584 |
| 2004/0020591 | A1* | 2/2004 | Tuma ......................... 156/242 |

FOREIGN PATENT DOCUMENTS

| DE | 694 27 164 | 10/1994 |
| DE | 198 28 856 | 10/1999 |
| EP | 0 661 007 | 7/1995 |
| WO | WO 2004/103685 | 12/2004 |
| WO | WO 2005/092589 | 10/2005 |

* cited by examiner

*Primary Examiner*—Christina Johnson
*Assistant Examiner*—Larry Thrower
(74) *Attorney, Agent, or Firm*—Roylance, Abrams, Berdo & Goodman, L.L.P.

(57) ABSTRACT

A method produces a supporting web made of a predeterminable amount of plastic material having a multitude of molded elements molded inside mold cavities (12) of a forming tool (5). While applying a negative pressure at least in one portion of the cavities (12), enough plastic material is always applied to the mold wall (13) of the respective mold cavity to form a cavity (22) inside the molded element. A supporting web has a multitude of molded elements produced by using this method.

8 Claims, 3 Drawing Sheets

METHOD FOR PRODUCING A SUPPORTING WEB, AND SUPPORTING WEB

FIELD OF THE INVENTION

The present invention relates to a method for producing a supporting web from a definable amount of plastic material with a plurality of molded elements. The molded elements are molded in mold cavities of a molding tool. The present invention relates to a supporting web with a plurality of molded elements.

BACKGROUND OF THE INVENTION

WO 02/13647 A2 discloses a process for producing an adhesive closing element with a plurality of molded elements built up symmetrically and connected integrally to the support. The molded elements are in the form of hooking means, having a stalk with a head part. A moldable material is supplied to a forming zone between a pressure tool and a molding tool. In the known process, viewed at least in one longitudinal section of the respective mold cavity, the opposing boundary walls extend continuously in a convex path. A continuously extending transition between the cross sectional shapes of the stalk and head part is achieved for the hooking means of the support so that an unimpeded mold removal process takes place.

DE 198 28 856 C1 discloses a process for producing a hook and loop connector piece with a plurality of hooking means made integrally with a supporting web as molded elements. A thermoplastic is supplied to the gap between the pressure tool and the molding tool. The molding tool has a screen with continuous cavities used as forming element on the molding tool. The hooking means are formed by the thermoplastic in the cavities of the screen at least partially hardening. The molding tool, on the side of the screen facing away from the pressure tool, has a second forming element interacting with the screen cavities, and by which the thermoplastic is molded.

EP 1 028 639 B1 discloses a process for producing a supporting web from material with several stalks which extend from at least one side of the web. The process encompasses the following steps:

selecting at least one first material for a first material layer,
selecting at least one second material for a second material layer,
melt molding of the first layer with a first surface and a second surface of the first material,
melt molding of the second layer with a first surface and a second surface of the second material,
connecting the first surfaces of the first and second material layers, while the layers are in the molten state, for forming a multilayer film, and
forming several stalks on at least the second surface of the second material layer,
this mold step comprising molding of several stalks of at least the first material and/or the second material, with the process comprising the step of controlling the processing conditions and the thickness, viscosity, and relative quantities of the first and second materials such that the first material forming the first layer projects in or through the stalks formed on the second surface of the second later and forms part of the stalks.

Furthermore, this European document discloses a web produced using this process. With the known solution, at least one of the two material layers is produced by coextrusion of the plastic material. In another process step, the stalk ends are calandered with another forming roll to obtain a mushroom-shaped hook fastener material.

With the known process, a plurality of different embodiments of a hook and loop fastener part with preferably mushroom-shaped hook and loop fastener parts are obtained and are characterized in that the respective fastener element (stalk and head) is made solid, i.e., consists throughout of a plastic material.

SUMMARY OF THE INVENTION

An object of the present invention is to provide improved processes and fastener systems such that their possible applications are widened.

This object is basically achieved by a process where, with application of a negative pressure, at least for a part of the mold cavities of the mold tool, so much plastic material is moved onto the mold wall of the respective mold cavity that a cavity is formed within the molded element. A supporting web made correspondingly is characterized in that the individual molded elements at least partially have a cavity.

According to the present invention, it is possible to make a cavity in molded elements with a geometry definable at will, achieving a host of advantages. In addition to saving weight and material to benefit production costs, better heat-insulating properties can be achieved by an air cavity. By determining the cavity volume, the stiffness for the molded element can be set so that it has adjustable resilience within definable limits. The resilience plays a part especially when the molded element is designed as a mushroom-shaped hook fastener material, with the result that in interaction with a fleece material or a correspondingly different hook and loop fastener material, the elements interacting with one another to form the closed hook and loop fastener can be more easily moved against one another under the closing pressure. This ability greatly improves engagement behavior. Then more fastener elements can interact with one another by the engagement behavior that is improved in this way. This engagement behavior in turn benefits the peeling strength values of the fastener, and can lead to an increase in fastening forces.

Furthermore, the cavities can be used appropriately. For example, the possibility exists of adding a coloring medium directly in the production process or later by injector nozzles. Subsequent coloring processes for the supporting web with molded elements, especially in the form of a hook fastener, in which the color must be imprinted first, can then be omitted. In addition to conventional dyes, luminescent pigments or the like can be added as the medium. Furthermore, open cavities can be produced in this way in the molded element on their side facing away from the supporting web either close to the production process in time or later by corresponding notches so that within the molded element capillaries are formed. The capillaries provide self-cleaning surfaces (lotus effect) with a shape having a capillary action where the quotient of the capillary work K and adhesion work A is greater than 1 (see in this respect also DE 102 07 193 A1).

Moreover, the process of the present invention can be made reliable and economical in terms of production engineering. In one production step, a hook fastener material is obtained. In the prior art, multistep processes with subsequent calandering of the free stalk ends for head forming are shown.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
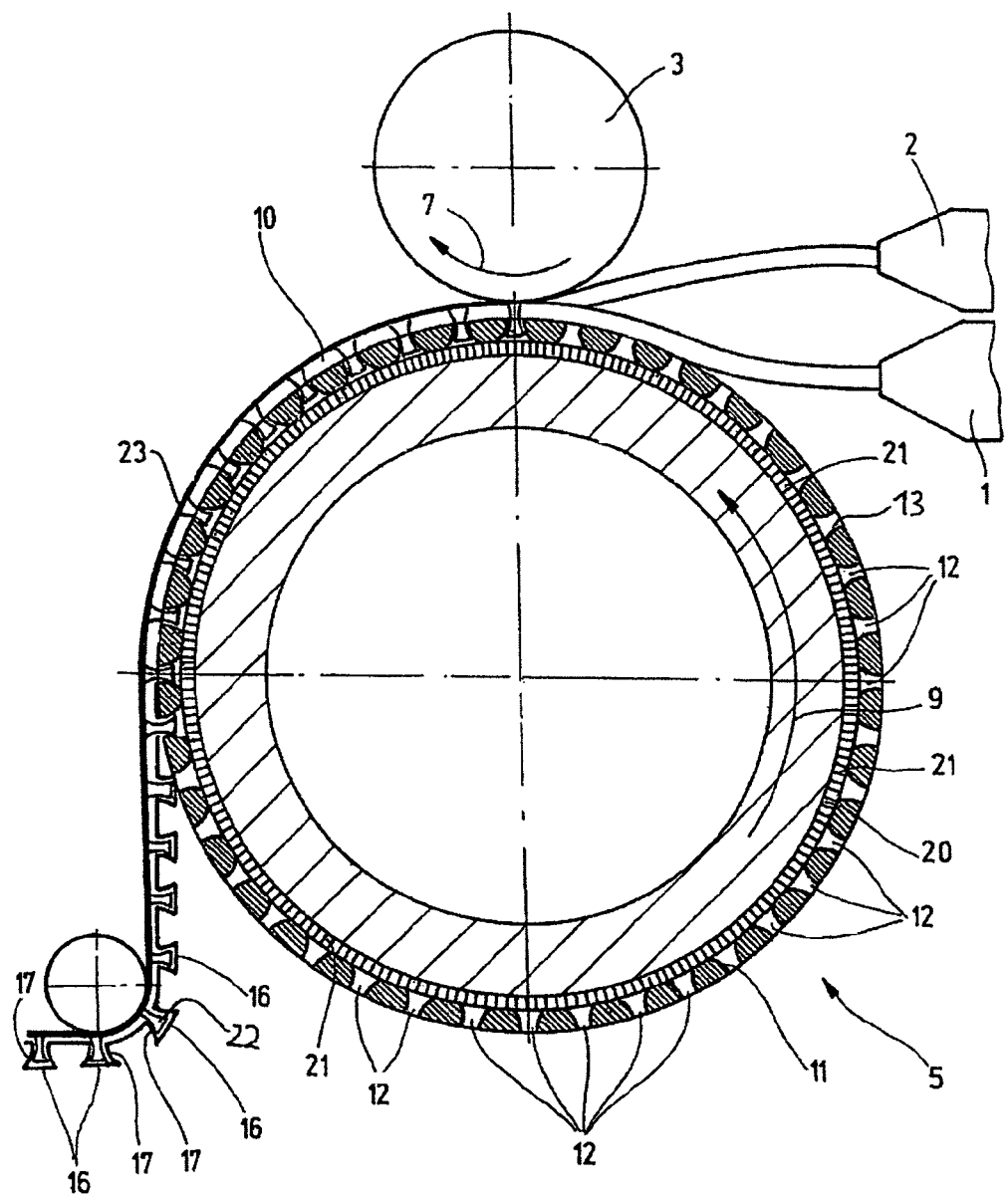
FIG. 1 is a highly schematically simplified, side elevational view in section of a device for executing the process according to an exemplary embodiment of the present invention.
Figure 2:
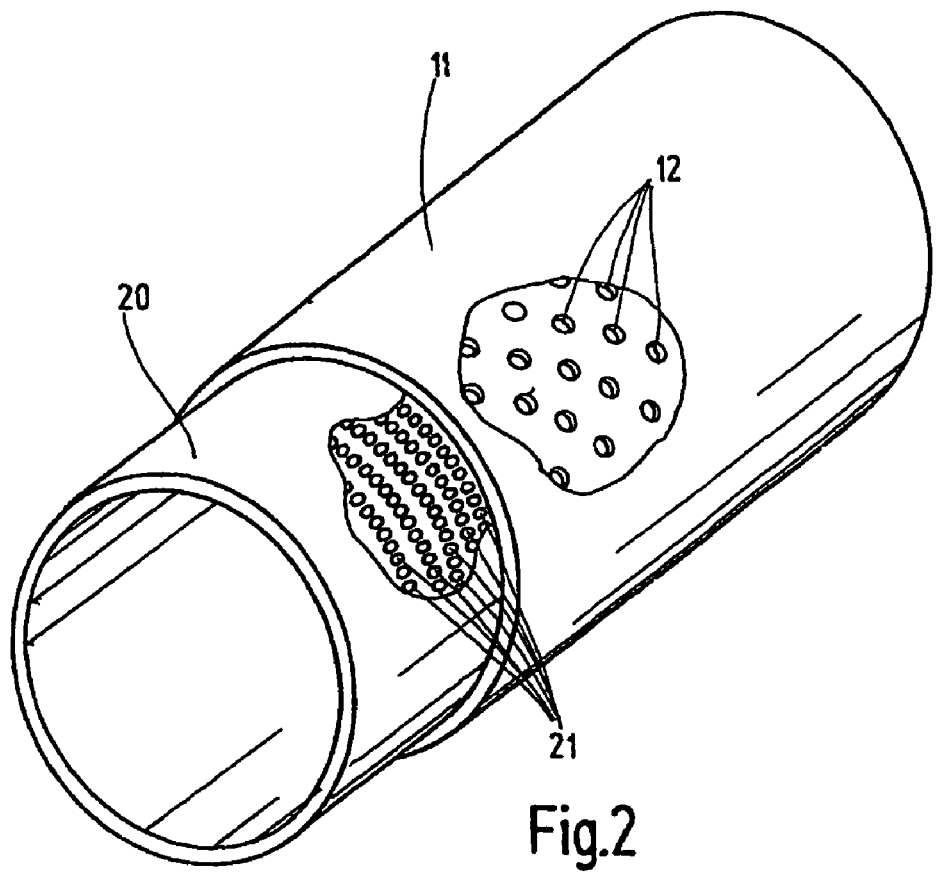
FIG. 2 is a perspective view of two screens pushed into one another with cavities formed by the screen openings and shown exaggerated in areas for the sake of illustration of the device of FIG. 1.

FIG. 1 schematically shows parts of an exemplary embodiment of a device for executing or performing the process or method of the present invention. An extruder head 1 provides the supply means for plastic material in a plastic or liquid state and as a belt or strip with a width corresponding essentially to that of the hook and loop fastener part to be produced. The plastic material is directly supplied to a gap between the pressure tool 3 and the mold tool 5. The pressure tool is a press roll, while the mold tool is a mold roll 5. Both rolls are driven in the directions of rotation indicated in FIG. 1 with curved arrows 7 and 9. Between the rolls, a conveyor gap is formed through which the plastic material is conveyed in the transport direction. At the same time in the gap as the forming zone, the plastic belt or strip is formed into the supporting web 10 of the hook and loop fastener part. The supporting web 10 on the side adjoining or facing the mold roll 5 acquires the shape necessary to form hooking means or hooks by the forming elements of the mold roll.

Figure 3:
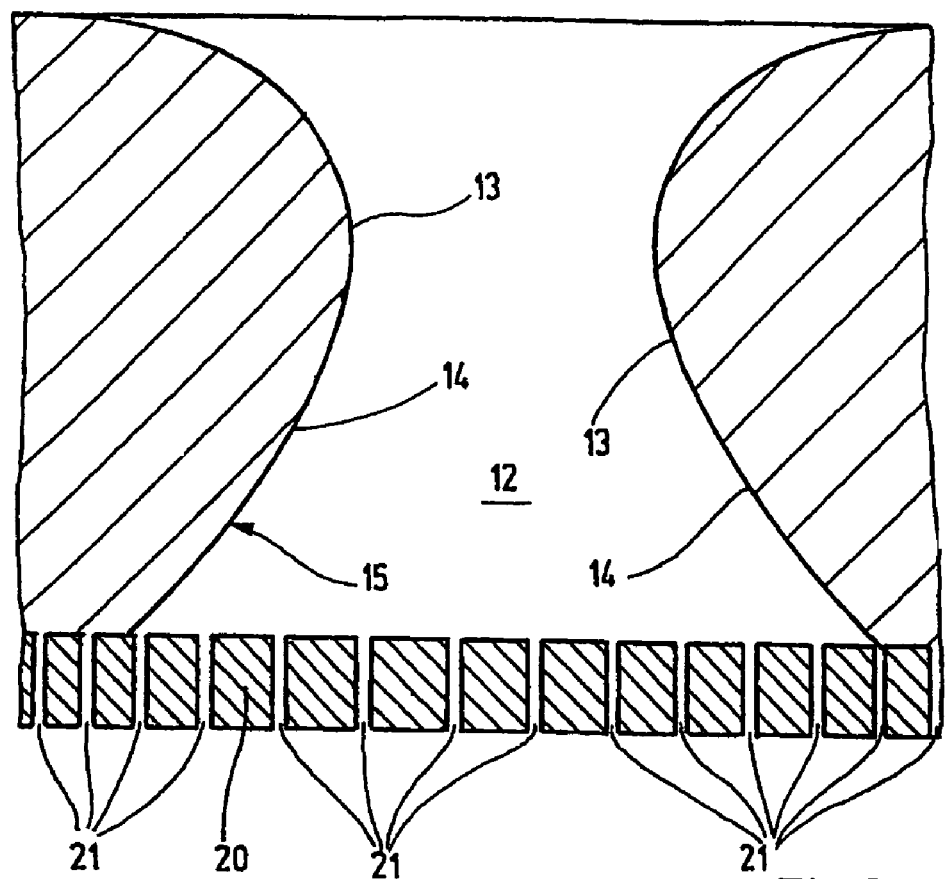
FIG. 3 is a highly enlarged, side elevational view in section of the screens shown in FIG. 2.

For this purpose, the mold roll on the periphery has a screen 11 with individual cavities 12. This mold cavity 12 is shown enlarged, for example, in FIG. 3. Furthermore, the mold cavities 12 that are not detailed are typically distributed on the outer peripheral side in the longitudinal direction over the mold roll with its screen 11. The distribution and number of cavities are freely selectable. FIG. 3 shows a longitudinal section again of the mold cavity 12, where the boundary walls 13 opposite in the longitudinal section extend continuously with a convex shape 14. The two boundary walls 13 with respect to the rotationally symmetrical structure of the mold cavity 12 are fundamentally part of a terminating forming wall 15 bordered by the screen material 11 of the mold roll. With these mold cavities 12, hooking means in the form of a stalk 17 with a head part 16 (compare FIG. 4) can be produced.

As FIG. 3 furthermore shows, the curvature of the respective path 14 in the direction of the head part 16 to be molded is made more pronounced than in the direction of the foot part 18 via which the stalk 17 is connected to the supporting web 10. It has proven especially advantageous if viewed from the longitudinal direction of the stalk 17 in the direction of the head part 16, the path 14 with its greater curvature is located above the middle, preferably starting in the upper third. To obtain the indicated mold cavities 12 with their rotationally symmetrical structure in the form of a hyperboloid, galvanic coating processes (electroplating) have been found to be favorable to production. Furthermore, the convex path 14 can optionally be produced from a screen or solid grate material also by a laser process.

Figure 5:
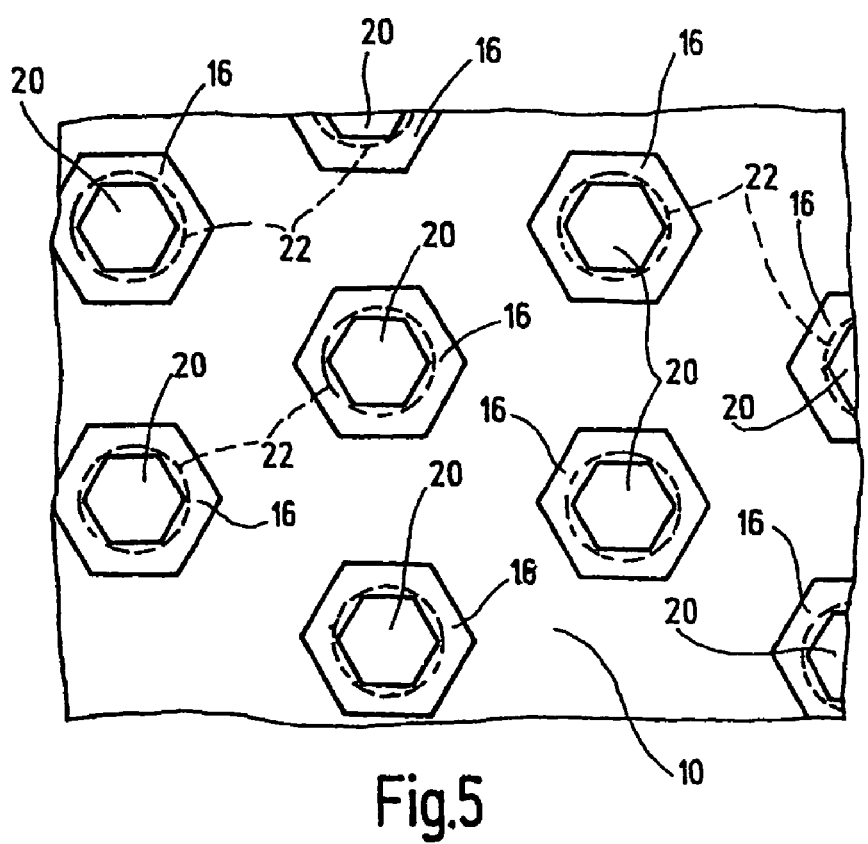
FIG. 5 is a top plan view of the supporting web produceable with the device shown in FIGS. 1 to 3, with several hooking means as molded elements according to the individual representation in FIG. 4.
Figure 4:
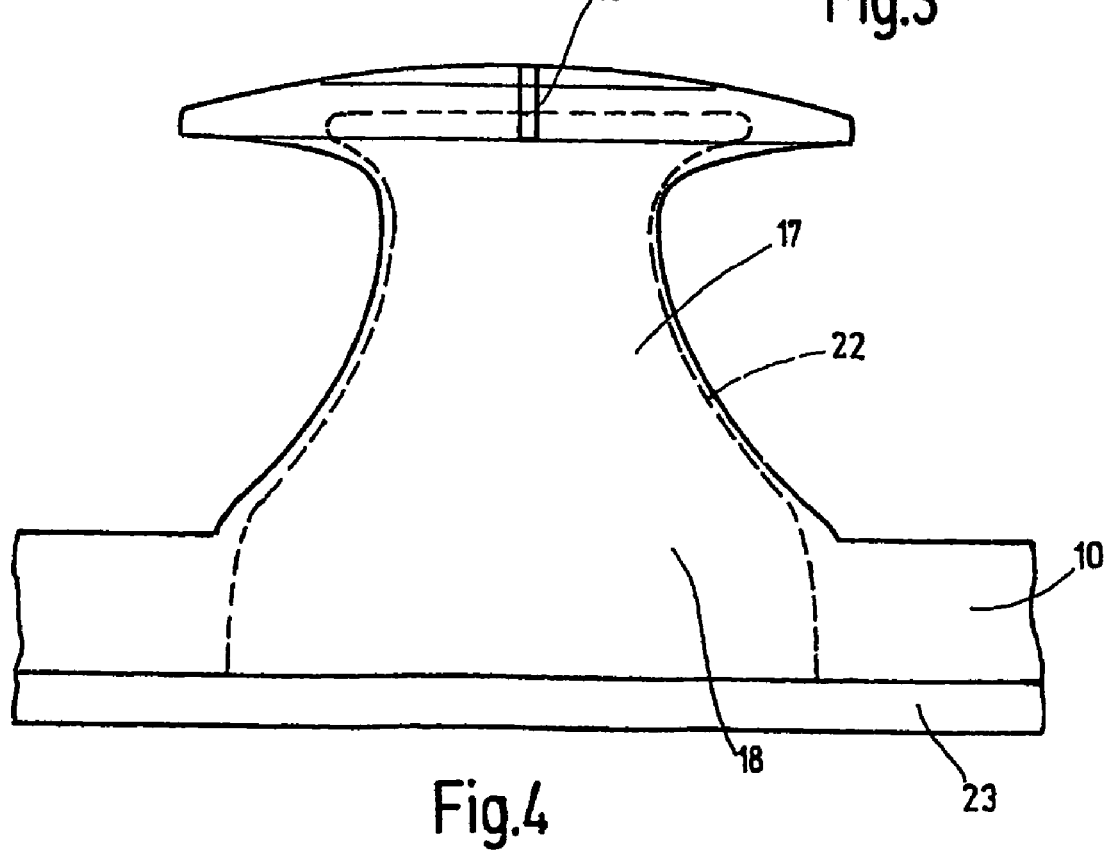
FIG. 4 is a side elevational view of a hooking means produceable with the device shown in FIGS. 1 to 3.

The individual hooking means or hook shown in FIG. 4 as a molded element can be obtained with the above described process. The symmetrical structure arises directly by production in a mold cavity 12 shown in FIG. 3. This hooking means can be made geometrically very small, for example, can have a height of only 0.4 mm with a width of the fastener head of approximately 0.6 mm. The cross section of the stalk 17 in this embodiment is approximately 0.25 mm. Furthermore, as shown in FIG. 5, a plurality of these hooking means can be on the supporting web 10. The head shape of the head part 16 need not be further reworked, so that with the process of the present invention the fastener material can be obtained with essentially only one production step. Furthermore, cuts can be made in the outside contour of the inherently closed annular head part 16 to obtain a plurality of hooks along the head part 16. The hooking means shown in FIGS. 4 and 5 can also appear differently, especially in terms of their head part 16, for example, can be provided with head geometries as is already shown in PCT/WO 00/00053.

In a concentric configuration to the screen 11 and positioned inside or underneath, another screen 20 is provided with its outer side is in direct contact with the inside of the screen 11. This additional screen 20 has a plurality of screen passages opposite the mold cavities 12 of the first screen, for example, more or less 10,000 to 20,000 passage per $cm^2$. The passages 21 formed in this way are selected to be geometrically so small in diameter that they do allow air to pass, but essentially do not allow the plastic to be molded to pass. Furthermore the forming process for the hooking elements can be controlled such that before the plastic material reaches the passages 21 the forming process for the head part 16 is already completed. This forming can be achieved, for example, via suitable temperature control by the mold tool 5. The other screen 20 is also galvanically built up, as already described for the first screen 11. The passages 21 can also be obtained as laser beam shots in cylindrical shape. It is possible to distribute the screen passages 21 uniformly over the entire periphery of the other screen 20 or to provide screen passages 21 only at the locations (not shown) where they are essentially covered by the mold cavity 12.

The plastic material originating from the extruder can be intaken into the mold cavities 12 by a vacuum or negative pressure means (not shown) having its supply via the interior (not shown) of the mold tool 5 in the form of a mold roller. On the one hand, the screen passages 21 are not clogged by the inflowing plastic material. On the other, the plastic material adjoins in a thin-walled manner the boundary walls 13, so that for each molded element a cavity 22 is formed, as shown by example in FIG. 4 for a hooking element. This cavity 22 extends rotationally symmetrically within the hooking means from its foot part 18 via the stalk 17 and ends in the head part 16. Furthermore, this cavity 22 penetrates the supporting web 10, and in this way communicates with the exterior.

Depending on the applied negative pressure, the cavities 22 can be controlled in terms of their geometrical configuration. Also, the wall thickness for the foot part 18, the stalk 17 and the head part 16 of the respective hooking means or mushroom-shaped fasteners can be controlled. By omitting the screen passages 21 or by closing these passages 21 or by applying negative pressure only to certain screen passages 21, certain individual hooking elements can also be produced free of cavities. Furthermore, with this process, together with the device, conventional fastener systems without a cavity 22 and selectively as necessary with a cavity 22 can be produced, depending on whether the process is carried out with or without negative pressure. For a correspondingly high negative pressure, the cavity 22 can penetrate the top of the head part 16 (not shown) so that capillary tubes can be produced within the fastener material. This forming of capillary tubes benefits self-cleaning of these surfaces (see in this respect the disclosure contents of DE 102 07 193 A1).

With a suitable choice of the plastic material, optionally the supporting web 10 with its molded element with cavities 22 can be produced independently. To increase the stability and especially to facilitate removal of the supporting web from the molding tool 5 with its mold cavities 12, attachment of a fastener web 23 on the back of a supporting web 10 can be recommended. To produce this fastener web 23 from a suitable plastic material, another extruder head 2 is used, as shown in FIG. 1. Provided, as is shown in FIG. 1, two extruder heads 1, 2 are used, fundamentally a multilayer structure forms for the hooking means in the form of a coextruded hook and loop fastener. It is also possible to replace the other extruder head 2 by an unwinding means, from which a film-like plastic web, but also metal strip could be unwound that then forms the back of the supporting web 10. Thus, for example, an adhesive can be applied on one side to this metal strip or plastic film web, on which then the supporting web 10 to be formed is adhered. With a suitable adhesive, this material connection of the layers could also be detachable again. In the embodiment shown in the figures, the supporting web 10 with the molded elements is formed of a low-density polyethylene (LDPE) material and the back or the fastener web 23 of a high-density polyethylene (HDPE) material.

As FIG. 4 shows in particular, the cavity 22 can lead to a hooking element made with very thin walls. Therefore, when engaged with other hooking means including fleece or hook material, it can be accordingly flexible in hooking behavior. This thin-walled structure increases the number of hooking possibilities, and consequently leads to an improved fastening force situation for the individual hooking means. Especially in the clothing and diaper industry where hook and loop fasteners should have "gentle behavior" to prevent skin injuries, the fastener elements formed with cavities 22 are more than advantageous. Furthermore, during or after the production process, the cavity 22 can be filled, for example, with a coloring medium, so that later dyeing of the fastener can be omitted. Luminescent media can also be placed in the cavities 22 to increase design possibilities for the fastener.

The process of the present invention need not be limited to application to fastener elements. Rather, there is a plurality of embodiments for the most varied types of molded elements. Thus, for a modified screen structure with the illustrated forming process, only cylindrical stalks 17 with correspondingly cylindrical cavities 22 can also be attained. Depending on the structure of the mold cavity for the mold tool 5, a plurality of embodiments is conceivable. The two screens 11, 20, when worn, can be easily removed from the actual mold roll and replaced by new screens. The possibility at least also exists of producing the other screen 20 as a one-piece component of the mold roll or altogether a mold roll with the mold cavity gradient 12 in addition to screen passages 21.

The plastics to be processed can be diverse, for example, in the form of polyamides or polyolefins, such as polypropylene or polyethylene (HDPL and LDPL). Other thermoplastics are used, such as polyester, polyethylene terephthalate, polystyrenes, polycarbonates, polymethyl methacrylates, ethylene vinyl acetate copolymers including acrylate modified ethylene, vinyl acetate polymers and ethylene acrylic acid copolymers as well as polyethylene styrenes. The use of duroplastics is conceivable, as is use of elastomers such as naturally or synthetically producible rubber including styrene block copolymers with portions of isoprene, butadiene, or ethylene (butylene) blocks. The use of metallocene-catalyzed polyolefin, polyurethane or polydiorganosiloxanes is possible. If these webs with the molded elements are not obtained completely in the coextrusion process, but, for example, from the combination of a metallic strip with a plastic supporting web, pressure sensitive adhesives or hot-melt adhesives are used to join the strip and web. To stiffen the respective web and for strengthening, ductile thermoplastics can be used, such as nylon or polyvinyl chloride. The molded element article produced in this way can also be provided with coatings which can also be deposited by evaporation or doctoring. Furthermore, to produce structuring in the sense of self-cleaning surfaces, aftertreatments are possible, whether with a laser, ultrasound, or the like. Manufactured materials which are biodegradable can also be used.

While one embodiment has been chosen to illustrate the invention, it will be understood by those skilled in the art that various changes and modifications can be made therein without departing from the scope of the invention as defined in the appended claims.

What is claimed is:

1. A method for producing a supporting web with a plurality of molded elements from a definable amount of plastic material, comprising the steps of:
   supplying moldable plastic material directly from an extruder to a molding tool and into mold cavities in the molding tool to form mushroom-shaped fasteners on a supporting web with each fastener having a head part, a stalk connected to the head part at one end thereof and a foot part at an opposite end of the stalk connected to the supporting web; and
   applying a negative pressure to at least some of the mold cavities so that the plastic material is moved onto mold walls of the respective mold cavities and fastener cavities are formed in the respective fasteners simultaneously with fastener formation from the plastic material of the extruder, each of the fastener cavities being rotationally symmetrical inside the respective fastener and extending from the respective foot part through the respective stalk at least as far as the respective head part.

2. A method according to claim 1 wherein
   said cavities extend through the supporting web.

3. A method according to claim 2 wherein
   each of the fastener cavities are closed on one end thereof by a fastener web.

4. A method according to claim 3 wherein
   at least one of the supporting web and the fastening web is formed from a coextrudate.

5. A method according to claim 3 wherein
   at least one of the supporting web and the fastening web is formed from a metallic layer.

6. A method according to claim 3 wherein
   the fastener cavities communicate to an exterior of the fasteners on ends thereof remote from the fastener web.

7. A method according to claim 1 wherein
   the fastener cavities are filled with a medium.

8. A method according to claim 1 wherein
   the mold tool has one of a mold roll and a mold belt with a forming screen layer and another screen layer with passages therein through which the negative pressure is applied.

* * * * *